US007877563B2

(12) United States Patent
Breslau et al.

(10) Patent No.: US 7,877,563 B2
(45) Date of Patent: Jan. 25, 2011

(54) PROGRAMMABLE MEMORY DEVICE SECURITY

(75) Inventors: Franklin C. Breslau, Teaneck, NJ (US); Rick A. Hamilton, II, Charlottesville, VA (US); John P. Kaemmerer, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 11/608,002

(22) Filed: Dec. 7, 2006

(65) Prior Publication Data
US 2008/0140967 A1 Jun. 12, 2008

(51) Int. Cl.
G06F 13/00 (2006.01)
G06F 13/28 (2006.01)

(52) U.S. Cl. .............................. 711/163; 711/E12.091; 711/115; 713/182

(58) Field of Classification Search .......... 711/E12.091, 711/163; 713/182
See application file for complete search history.

(56) References Cited
U.S. PATENT DOCUMENTS

| | | | | |
|---|---|---|---|---|
| 5,533,125 A * | 7/1996 | Bensimon et al. | ........... | 711/163 |
| 6,011,473 A * | 1/2000 | Klein | .......................... | 340/571 |
| 6,175,517 B1 * | 1/2001 | Jigour et al. | .................. | 365/63 |
| 6,862,604 B1 * | 3/2005 | Spencer et al. | .............. | 707/205 |
| 7,447,807 B1 * | 11/2008 | Merry et al. | .................... | 710/8 |
| 7,735,116 B1 * | 6/2010 | Gauvin | ........................... | 726/2 |
| 2002/0002685 A1 | 1/2002 | Shim | | |
| 2003/0009424 A1 * | 1/2003 | Ta et al. | ......................... | 705/51 |
| 2004/0103302 A1 | 5/2004 | Yoshimura et al. | | |
| 2004/0181673 A1 * | 9/2004 | Lin et al. | ..................... | 713/182 |
| 2004/0252628 A1 | 12/2004 | Detzler | | |
| 2005/0219732 A1 | 10/2005 | Ito | | |
| 2005/0257049 A1 | 11/2005 | Farag | | |
| 2007/0214332 A1 * | 9/2007 | Sonoda et al. | .............. | 711/163 |

FOREIGN PATENT DOCUMENTS

WO  WO 02095550 A2  11/2002
WO  WO 2004090828 A1  10/2004

* cited by examiner

Primary Examiner—Taghi T Arani
Assistant Examiner—Narciso Victoria
(74) Attorney, Agent, or Firm—Patrick J. Daugherty; Driggs, Hogg, Daugherty & Del Zoppo Co., LPA

(57) ABSTRACT

A removable digital data storage device has a programmable memory controller, a data storage medium and a data destruction means. The memory controller is encoded with a firmware program to provide a computer device driver interface, wherein the firmware program further configures the memory controller to secure data on the medium by querying for a hardware code in response to a data operation request by a computer through the interface and either granting access in response to a hardware code input or, independent of an operational status of the requesting computer, directly instructing the data destruction means to render data residing on the data storage medium unreadable in response to a failure to receive the first hardware code input through the interface.

17 Claims, 3 Drawing Sheets

PROGRAMMABLE MEMORY DEVICE SECURITY

FIELD OF THE INVENTION

The present invention relates to devices, and methods and program products for securing computer data storage structures from unauthorized data access, and more particularly to preventing unauthorized access to data through theft of data storage structures.

BACKGROUND

As the computing power and data storage capacities continue to progressively improve, large amounts of data that were historically stored and maintained on large centralized server structures are increasingly migrating to individual laptop and desktop computers and portable storage devices. While large portable computer data storage capacities thus offer new efficiencies, such data migrations have also created significant new data theft exposures.

For example, in a business setting, it is common for a desktop or laptop computer to contain confidential employer or client information. In one incident, a laptop computer containing the personal information of 196,000 clients was stolen, including client name, address, birth date and social security information. It is readily apparent that failure to secure such information from unauthorized access by third parties can expose a responsible party to significant costs and legal liabilities.

BRIEF SUMMARY

A removable digital data storage device and methods for removable digital data storage device data security are provided. The removable digital data storage device has a programmable memory controller, a data storage medium and a data destruction means. The memory controller is encoded with a firmware program to provide a computer device driver interface, wherein the firmware program further configures the memory controller to secure data on the medium by querying for a first hardware code in response to a data operation request by a computer through the interface and either granting access in response to a first hardware code input or, independent of an operational status of the requesting computer, directly instructing the data destruction means to render data residing on the data storage medium unreadable in response to a failure to receive the first hardware code input through the interface.

In another aspect, the memory controller is further configured to terminate granted data access upon an elapse of a time period, a memory controller power status change, a requesting computer system power status change, or an interruption to a connection between the memory controller and the requesting computer system.

In another aspect the memory controller is further configured to select a user security level in response to a security parameter input and query for the first hardware code, grant the computer user access to perform the data operation or instruct the data destruction means to render data unreadable in response to the selected security level. In one aspect the security parameter is a storage device location parameter. And in another aspect the removable storage device further comprises an auxiliary vicinity detection system, wherein the memory controller is further configured to use the auxiliary vicinity detection system to determine the storage device location parameter.

In another aspect, a detected a storage device removal event causes the memory controller to query for the first hardware code upon detection or upon a power-up event subsequent to the detection. In one aspect, the memory controller detects the storage device removal event by failing to find an authentication credential on the first computer.

In another aspect, the firmware program configures the memory controller to query for at least one of the first hardware code and a second hardware code prior to instructing the data destruction means to render data residing on the data storage medium unreadable, and stop the data destruction means in response to an input of at least one of the first and second hardware codes. In one aspect, the memory controller stops the data destruction means in response to first hardware code or powers down the data storage device in response to the second hardware code.

In another aspect, an article of manufacture is provided comprising a computer usable medium having a computer readable program embodied therein, wherein the computer readable program, when executed on a removable digital data storage device programmable controller, causes the controller to execute the procedures of providing an interface between a first computer and the data storage medium, querying for a first hardware code in response to a data operation attempt on the data storage medium through the interface by the first computer; and granting the first computer access to the data storage medium in response to a first hardware code input or independent of an operational status of the first computer instructing the data destruction means to render data residing on the data storage medium unreadable in response to a failure to receive the first hardware code input through the interface.

In one aspect, the computer readable program further causes the controller to select a security level in response to a security parameter input; and query for the first hardware code, grant access or instructing the data destruction means to render data unreadable in response to the selected security level. In another aspect, the computer readable program further causes the controller to detect a storage device removal event and query for the first hardware code in response. In another aspect, the computer readable program further causes the controller to query again for at least one of the first hardware code and a second hardware code prior to instructing the data destruction means to render data residing on the data storage medium unreadable, and stop the data destruction means in response to an input of at least one of the first and second hardware codes. In another aspect, the computer readable program further causes the controller to power down the data storage device in response to an input of the second hardware code.

Still yet, any of the components of the present invention could be deployed, managed, serviced, etc. by a service provider who offers to provide data security through programming memory device controllers. Thus in one aspect, a method for deploying computing infrastructure is provided, comprising integrating computer-readable hardware code into a removable digital data storage device programmable memory controller, the removable digital data storage device further comprising a data storage medium coupled to the controller computing system and a data destruction means in communication with the controller computing system and coupled to the medium, wherein the hardware code in combination with the controller computing system is capable of performing a process of data security. More particularly, the data security process comprises the controller providing an interface between a first computer and the data storage medium, the first computer attempting a data operation on the data storage medium through the interface, the controller querying for a first hardware code in response to the data operation attempt; and the controller granting the first computer access to the data storage medium in response to a first hardware code input or independent of an operational status of the first computer the controller instructing the data destruction means to render data residing on the data storage medium unreadable in response to a failure to receive the first hardware code input through the interface.

BRIEF DESCRIPTION OF THE DRAWINGS

These and other features of this invention will be more readily understood from the following detailed description of the various aspects of the invention taken in conjunction with the accompanying drawings in which.

Figure 1:
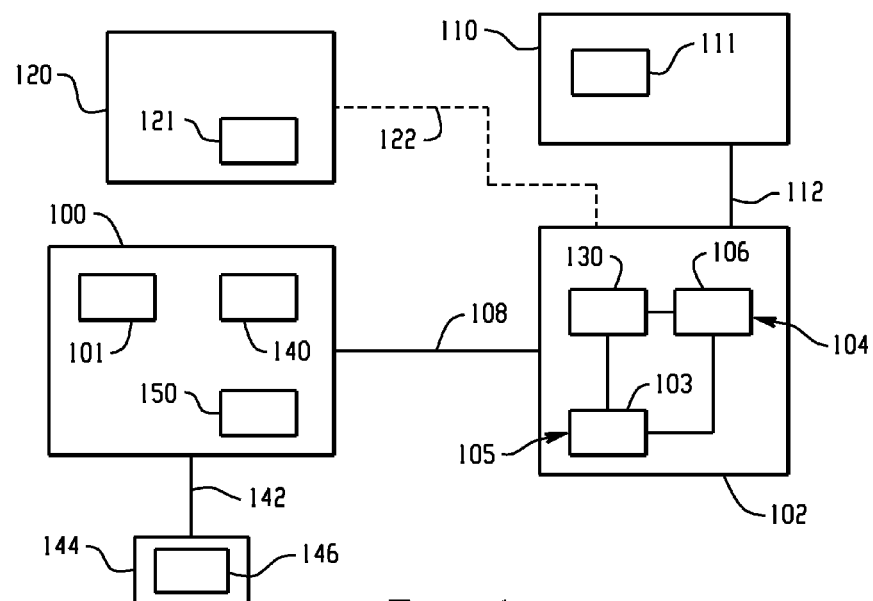
FIG. 1 is schematic illustration of storage device according to the present invention, illustrated with respect to interfacing computers and associated devices.

The invention may take form in various components and arrangements of components, and in various steps and arrangements of steps. The drawings are intended to depict only typical embodiments of the invention and are not to be considered as limiting the scope of the invention. Moreover, the drawings are not necessarily to scale and are merely schematic representations not intended to portray specific parameters of the invention. In the drawings, like-numbering represents like-elements.

DETAILED DESCRIPTION OF THE INVENTION

Still further aspects of the present invention will be appreciated by those of ordinary skill in the art upon reading and understanding the following detailed description.

FIG. 1 is a schematic illustration of a computer 100 in communication with a memory unit 102 according to the present invention, upon which may be stored computer data including sensitive data 104. Sensitive data 104 is any data, which is intended to be restricted to authorized parties; in some examples it is defined by statute and/or express or implied legal obligations. The memory unit 102 may be incorporated structurally into a computer 100 and accessed through a wired communication connection 108. Alternatively it may be located physically remote from one or more computers 100/110, for example as an external memory unit 102, and accessed through a wired or wireless communication connection 108/112. FIG. 1 also illustrates an additional computer memory resource 101, and a remote computer or computer device 110 with a remote memory resource 111, the remote computer 110 in communications with the memory unit 102 through a wired or wireless communication connection 112.

The present invention may be applied with respect to any digital data storage unit 102 with a programmable controller 103 configured to run firmware 105 for controlling access to a storage medium 106. The firmware 105 comprises machine code instructions sometimes referred to "hard software" or "hardware code." Loaded into the memory controller 103, the firmware 105 thus enables the memory controller 103 to function as an interface (also sometimes known as a device driver) to computer 100/110/120 operating systems software and cause the memory unit 102 hardware to perform data read/write functions requested by a computer 100/110/120 at an application software level. And according to the present invention, the firmware 105 also enables the controller 103 to condition access to the secure data 104 on the entry of one or more specific hardware code inputs, thus providing security procedures at the device driver level. According to the present invention integrating security features directly into the programmable controller 103 through the firmware 105 enables security feature portability with the device unit 102, thereby enabling data security functionality where the device 102 is removed from incorporation into or connection to an authorized computer 100/110 and unauthorized data access attempts are made upon the storage medium 106 by another second computer 120.

Figure 2:
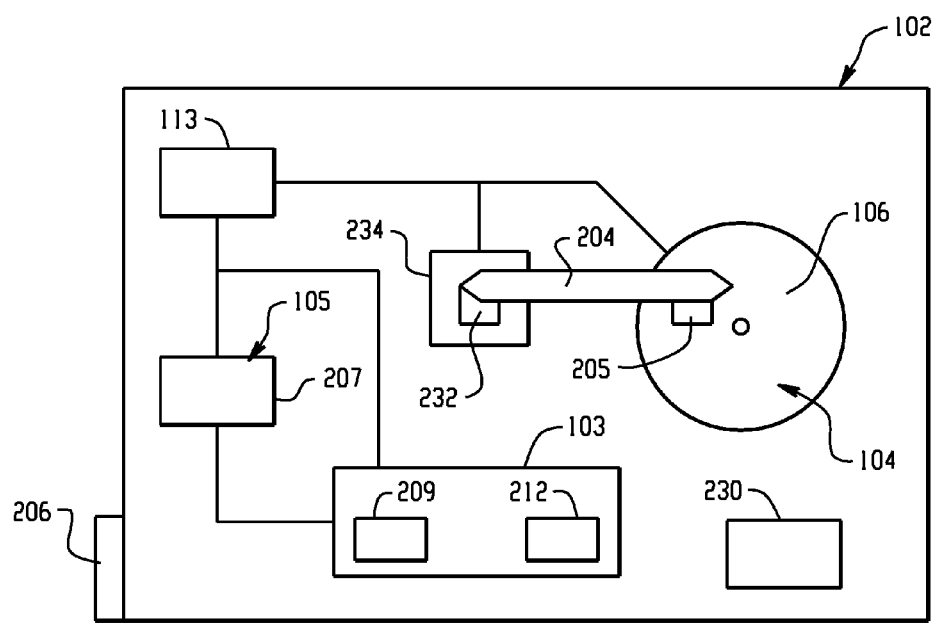
FIG. 2 is another schematic illustration of storage device according to the present invention.

The storage medium 106 commonly retains stored data upon loss of power and is conventionally referred to as a "read-only memory" (ROM) medium; illustrative examples include hard disk drives, flash drive units, optical disk read/write units. FIG. 2 illustrates a hard disk drive embodiment of the memory unit 102, wherein the memory unit controller 103 is a circuit board with one or more programmable processing chips 209 configured to run the firmware 105. The firmware 105 may be loaded from one or more device memories 207, or it may be loaded through transmission mediums 108/112/142. However, the specific hardware structure of the medium 106 is not critical to practicing the present invention, and alternative memory medium 106 structures such as random access memory (RAM) and other alternatives, may also be practiced, as will be comprehended by one skilled in the art of digital data storage system design and implementation.

Figure 3:
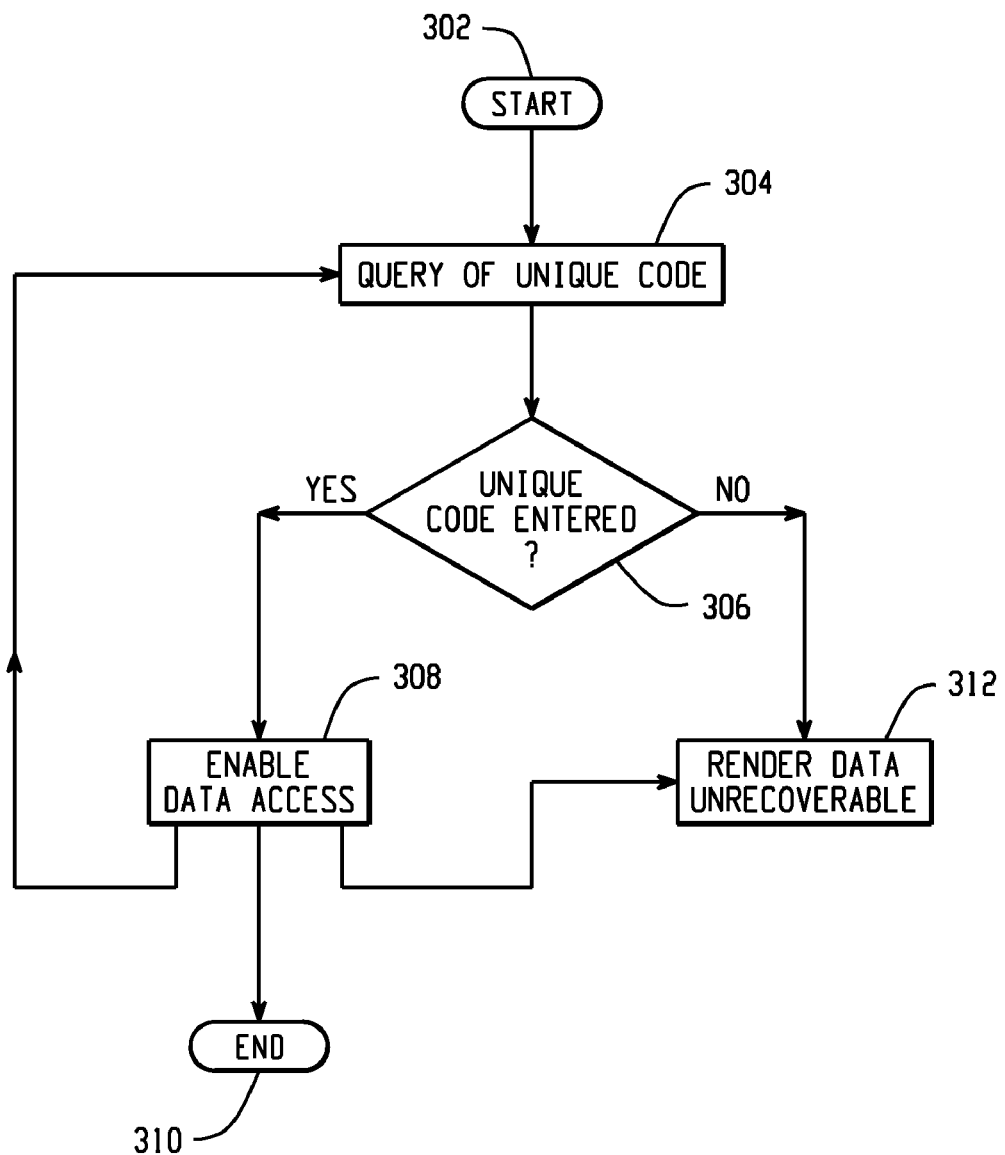
FIG. 3 is a flow chart illustration of aspects of the present invention.

Referring now to FIG. 3, a data security procedure according to the present invention is initiated at 302. In the present example the initiation step 302 is a power up event of the memory unit 102, wherein the firmware 105 is loaded into the memory controller 103, and the memory controller 103 is configured to thereby provide secure access to data stored on the storage media 106. Other initiation event 302 examples include a data access request is received by the memory controller 103 from the computer 100/110, and/or a security event received and/or detected by the memory controller 103. The firmware 105 then causes the programmable memory controller 103 to respond to the initiation event 302 with a query for input of a hardware access code at 304.

If the access code is not entered at 306 then procedures are initiated to render the secure data 104 unreadable or unrecoverable at 312. This may be accomplished in a variety of fashions, as will be comprehended by those skilled in the electrical and mechanical arts. Thus the concept of destroying data as discussed herein includes replacing memory medium 106 element data entries with other digital data, such as through formatting, reformatting and replacing the digital representations of the secure data 104 with new digital data; it also encompasses the physical altering of destruction of aspects of the medium 106 itself, thus indirectly destroying the secure data 104 thereon or rendering reading of the secure data 104 from the medium 106 impossible. The specific means or mechanism of rendering retrieval of the secure data 104 from the medium 106 impossible is not critical to the present invention.

If however, the access code is entered at 306, then access to the sensitive data 104 is enabled by the memory controller at 308 until the memory controller 103 either again requires new data access authorization at 304, initiates procedures to render the secure data 104 unreadable or unrecoverable at 318, or ends the process at 310. Exemplary ending events 310 include power down, stand by or hibernation of the memory unit 102, memory controller 103 or computer 100/110; interruption of a respective connection 108/112 between the memory unit 102 and a computer 100/110; entry of a software command to the memory controller 103 through a computer 100/110 interface; and a hardware level event occurring at the memory controller 103 or computer 100/110. Other ending events 310 will be readily apparent to one skilled in the art.

According to the present invention, no separate computer 100/110 function or power status is required by the memory controller to initiate and execute procedures to render the data 104 inaccessible from the medium 106. The memory controller 103, through execution of the firmware 105 hardware codes, may accomplish the rendering of the secure data 104 destroyed or unrecoverable independent of an operational status of any computer 100/110/120. This enables portability of the memory device 102 between various computers 100/110/120 while enabling functionality of methods to render the secure data destroyed or unrecoverable, in contrast to prior art systems and methods that require the incorporation and operation of a separate computer or data destruction means to function.

Figure 4:
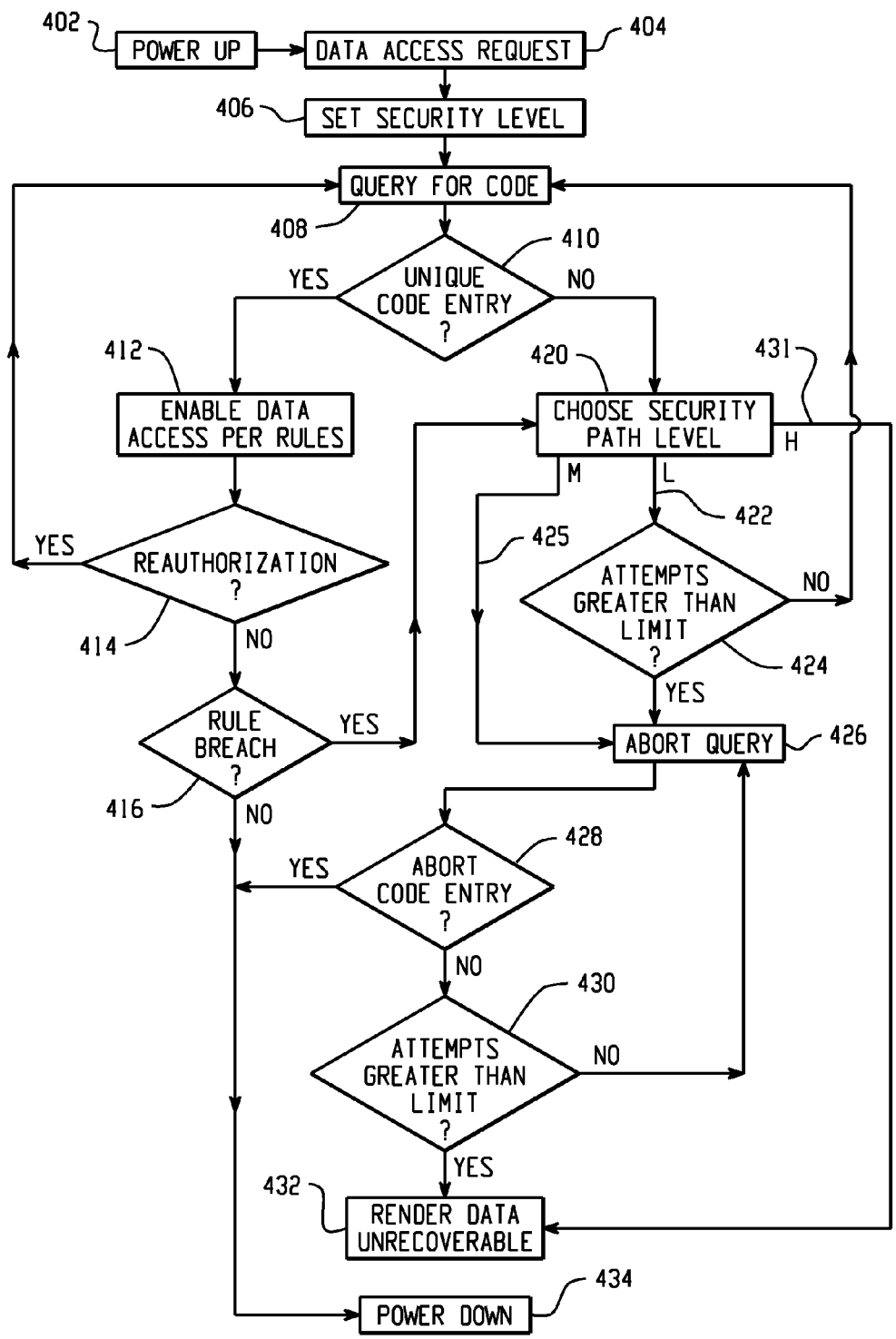
FIG. 4 is another flow chart illustration of aspects of the present invention.

FIG. 4, illustrates another procedure to secure data on memory media according to the present invention. A memory unit 102 is powered up at 402, wherein the firmware 105 is loaded into the memory controller 103 (for example, from the unit device memory 207), and the memory controller 103 thereby configured to provide access to data stored on the storage media 106. At 404 a data request from a computer 100 or remote computer/device 110/144 is received by the memory controller 103, and the controller 103 selects a security level at 406 for correlation with the data request in response to a security parameter, and at 408 the memory controller 103 queries for a hardware access code appropriate to the correlated security level. It is to be understood that the order of the steps 402, 404, 406 and 408 as described above is only exemplary, and one or more of said steps may occur in a different order or they may combined with one or more of each other. For example, a user may be prompted for the hardware access code immediately upon power up at 402, without a prerequisite data access request at 404 or setting of security level at 406.

Providing for the selection of different security levels for data access at 406 enables tailoring of selective data access in response to one or more specific parameters. For example, users may be identified and categorized with respect to security levels by a specific hardware access code entered and recognized by the firmware 105: high security level users recognized by a high-level code may enjoy greater secure data 104 access and/or administrator status with respect to the controller 103 relative to a low level user recognized by a low-level code.

Security levels may also be set based upon the location of the computer 100/110. For example, a desktop computer 100 may be required to remain in one physical location (e.g. a designated office), with a detected removal from the designated physical location presumed to be a theft or unauthorized removal which triggers data protection procedures or sets a higher security level, or both. In another example a portable or laptop computer 100/110 or memory unit 102 may be configured with low security levels and rules when located in a safe location, such as a designated office, office building, a medium security level may be set when located in a home office, and a high level may be set when located in a public area such as a coffee shop or airport.

Hardware access codes and security level inputs may be entered at 404,406 through active user inputs. For example, the memory controller 103 may cause the computer 100/110 operating system software to prompt a computer 100/110 user to enter an access code input. Alternatively, access code and security level inputs may be entered at 404,406 through passive user inputs, perhaps in the background or even unknown to a user. The programmable memory controller 103 as configured by the firmware 105 provides an interface to recognize an appropriate input regardless of input format (for example, an operating system software level keyboard input or a machine code data input from an auxiliary device 105/212) as a required hardware code input independent of computer resources 100/110/120.

Examples of access code and security level input include passwords entered through keyboard keystrokes by a computer 100/110 user. One or more auxiliary systems 150/212 may also be incorporated into a computer 100 or the memory device 102 to detect or receive other access or security inputs, located as deemed appropriate by one skilled in the art. For example, biometric authorization methods may also be used, such as voice sample authentication through a voice matching auxiliary system 150/212, or fingerprint recognition through a fingerprint reader auxiliary system 150/212, or retinal recognition through a retinal scanner auxiliary system 150/212. Physical authentication tokens may be used, such as Radio Frequency Identification (RFID) cards or sub dermal implants containing access authorization codes brought within a required proximity to an RFID receiver auxiliary system 150/212, or a magnetic strip-bearing card may be passed through a card scanner auxiliary system 150/212.

The computer 100/110 and/or the memory unit 102 may also incorporate a global positioning satellite system (GPS) auxiliary system 150/212, wherein the GPS device 150/212 periodically or constantly determines its geographic location and access codes and/or security levels are selected responsively. In one example a low security level may be selected at 406 and access to data granted until the computer 100/110 or memory unit 102 has been moved in excess of a predetermined distance from a GPS coordinate indicating the boundary of a safe location. A wireless fidelity (WiFi) auxiliary system 150/212 may also be used to determine location based upon a local area network (LAN) utilized by the computer 100/110 or memory unit 102 for communications.

A motion detector auxiliary system 150/212 may also be used to determine whether a computer 100/110 or the memory unit 102 has been moved and data protection routines selected in response thereto. For example, flipping a laptop computer 100 over and then removing the memory unit 102 within a specified threshold time period (for example, three seconds) may be recognized as one or more security level 406 or access code 410 inputs, for example allowing removal of the memory unit 102 from a laptop computer 100 without triggering procedures to render the data unreadable at 420 or 432.

A removal event may also indicate that the memory unit 102 has been disconnected from a first authorized computer 100/110 and reconnected to a second unauthorized computer 120, the second computer having a memory 121. This may be determined by searching the second computer 120 and/or its memory 121 for an authentication credential at 408 or security level credential at 406: in one example, failure to find an authentication credential at 408 may set a high security level at 404, and data protection procedures triggered responsively through a 408 query or initiation of procedures to render the secure data 104 unrecoverable at 420 or 432.

Next, entry of an appropriate access code at 410 grants access to sensitive data 104 by a computer 100/110 through the memory controller 103 interface pursuant to correlated security rules at 412. In one aspect the application of security rules may terminate granted data access: in the present example, at 414 the memory controller 103 requires renewed data access authorization after an elapsed time since entry of the access security code at 410 exceeds a predetermined threshold time period. In another example, if power is maintained to the memory unit 102 yet a power interruption to the computer(s) 100/110 occurs, such as where the computer(s) 100/110 enter(s) a standby or hibernate mode, then at 414 the user is again required to enter the access code at 410 before further data access is permitted.

Rule applications may also be configured at 416 to require that the data be immediately rendered unreadable on the memory storage media 106 at 432. Moreover, security rules and their application at 414 and/or 416 may be specified and applied in response to anticipated or observed computer 100/110 operating environments: for example, a breach of a first rule may indicate code reauthorization at 414 when a low security level is set, but breach of the same first rule during a high security level setting may indicate at 416 that procedures for rendering the data unreadable immediately commence at 420 or 432; or breach of a second rule may indicate that procedures for rendering the data unreadable immediately commence at 420 or 432, regardless of security level.

Lastly, when the memory unit 102, computer 100 and/or remote access computer/device 110 is powered down at 434, the procedure terminates. In one embodiment the access code entry at 410 is reset, thus requiring a repeat of the above described procedures at the next power-up (402) in order to gain access to the secure data 104. Alternative embodiments may require affirmative initiation of the protection procedures, for example by requiring the entry of a protect data code prior to power down at 434 in order to initiate data protection procedures upon the next device 102 power-up. Moreover, in other embodiments only some data stored on the memory device may be subject to data protection: for example, the memory unit storage media 106 may be partitioned into secured and unsecured areas, and data protection measures triggered only upon attempts to access the secure data 104 or secure data partition area, and not by data access to unsecured data or unsecured data partition areas. Further variations will be apparent to one skilled in the art.

Thus where an appropriate access code is not entered at 410, or as indicated by an appropriate rule breach at 416, the data may be immediately rendered unrecoverable at 432. Alternately, procedures may be initiated at 420, which afford additional opportunities to grant authorized access or otherwise protect the data 104 before destructive measures are taken at 432. Thus different destruction procedures may be selected, in some cases dependent upon an observed security level.

In the present example low, medium and high-level procedure paths 422,425,431 are selected at 420 dependent upon the security level set at 406. A low-security level path 422 initiates a query at 424 as to how many access code entry attempts have been made at 410: if an observed number of attempts does not exceed a threshold number, the user may be prompted for the access code through additional iterations at 408 until either the access code is entered at 410 or the threshold number is met or exceeded and an abort query is made at 426. Alternatively, a medium level security rule path 425 may also bring the user directly to the abort code query at 426 from the initiation step at 420.

An abort query at 426 may inform a computer user that data destruction procedures have been initiated and prompt the user for input of an abort code or other input to abort the data destruction procedure at 426. A separate abort code may be provided to personnel, software or hardware administrators, thereby enabling the administrators to prevent the loss of the data 104 where the access code required at 410 is temporarily unknown (for example, through temporary leave of a party having knowledge of the access code through illness, vacation, etc.) by aborting the data destruction. Alternatively, the abort code query may be made and satisfied in the background, unknown to a computer user as described generally above. In the present example, when the abort code is entered at 428 destruction procedures are terminated and the memory unit 102 is powered down at 434: this both preserves the secure data on the memory media 106 and prevents read/write access to the secure data 104 through a forced power-down.

If the abort code is not entered at 428, a user may be offered additional abort code entry opportunities at 430 until a threshold number of unsuccessful attempts is made, after which the sensitive data is rendered unrecoverable from the storage media 106 at 432. Moreover, in one option a rule breach may indicate a high-level path 431 directly from 420, or also as indicated by a rule during a granted data access at 416, to immediately render the data unrecoverable at 432. Thus the provision and administration of a plurality of abort or power down options may be provided, and each further dependent upon a security level parameter. It is also to be understood that abort or power-down codes may be queried for, input or received through passive or active activities in a variety of ways, including the examples provided above with respect to access code and security level inputs, methods and systems.

To prevent unauthorized access to the secure data 104, the data medium 106 or areas thereof containing the secure data 104 are rendered unrecoverable at 312/432, for example by a data destruction means 113. It is preferred that the data destruction means 113 be incorporated directly into the memory unit 103 structure, thereby preventing defeat of data security measures by disconnecting the memory unit 102 from alternative external/separate data destruction means (not shown). Power required for data destruction may be supplied to the memory unit 102 and/or the destruction means 113 from a standard computer interface 108/112. Alternatively, a separate power supply device 230 (e.g. a battery power supply 230) may provide power to the controller 103 and/or data destruction means 113 independent of computer 100/110 and memory unit 102 power supply, thereby enabling data destruction while power is terminated to the computer 100/110 or memory unit 102, or while either are powered-down.

As will be apparent to one skilled in the art, there are many ways appropriate for rendering the sensitive data 104 unrecoverable from the storage media 106 at 432 according to the present invention. For example, the sensitive data 104 as stored on the platter 106 may be destroyed or altered through electrical mechanisms, such as reversing the polarities of power supplied to the memory unit 102 from the computer 100 or from the power supply device 230, subjecting the platter 106 to sufficient reversed-polarity electrical energy to alter the storage media and thereby destroy or alter the sensitive data 104 thereupon. In another example portions of the storage media 106 containing the sensitive data 104 may be rewritten with new data, or reformatted, for example by the memory controller 103 directly or by the computer 100/110.

Mechanical means may also be used to render the sensitive data 104 on the storage media 106 inaccessible. For example, where the memory unit 102 is a hard drive mechanical means 232 may be used to physically prevent a read/write arm 204 or its associated motive apparatus from accessing the sensitive data 104 from the magnetic media surface of the storage platter 106. In another example the memory controller 103 may cause the destruction means 113 to release one or more chemical agents upon the storage media 106, etching or covering the surface with permanent glue or adhesive or otherwise rendering the media 106 unreadable. The read/write arm 204 may also incorporate a mechanical means 205 that may be deployed by the memory controller 103 and used to scratch, abrade or otherwise mechanically injure and render unreadable the surface of the platter 106. Moreover, other means for rendering the data unrecoverable at step 432 will be readily apparent to one skilled in the art, and the present invention is not limited to the examples provided herein.

Referring again to FIG. 1, the present invention may also be practiced in the form of providing a program to be executed by the device memory controller 103 or the computers/devices 100,110,120. Thus, a program according to the present invention may be stored on a computer readable storage medium 101,207,111,121,146 and accessible through one or more transmission mediums 108,112,122,142.

To this extent, the computer-readable/useable medium 101,207,111,121,146 includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system 101,207,111, 121,146 (e.g., a fixed disk, a read-only memory, a random access memory, a cache memory, etc.), and/or as a data signal (e.g., a propagated signal) traveling over a network (e.g., during a wired/wireless electronic distribution of the program code) through transmission mediums 108,112,122.

Illustrative but not exhaustive storage medium examples include volatile memory structures, and RAM and ROM structures, but the present invention is not so limited. In one aspect of operation, the program code may be read by a disk drive or a CD-ROM reading apparatus 140 and stored in a ROM device 101 or the like in the computer system 100 so as to be executed. In addition, a transmission medium such as network 142 is usable by a program transmitting apparatus 144 to provide the program to the computer system 100 and thereby to the memory controller 103. In some examples, the program may reside on a remote computer memory resource 111. As for the program transmitting apparatus 144, it is sufficient to have a computer memory 146 for storing the program and program transmitting means 144 for providing the program to the computer system 100 or memory 101 or memory controller 103 and memory device memory 207 via the network 142,108.

It is to be understood that embodiments of the computers 100/110/120 include stand-alone and networked computers and multi-part computer systems. More particularly, FIG. 1 is provided to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Moreover, the computers 100/110/120 are intended to demonstrate that some or all of the components of implementation depicted in FIG. 1 could be deployed, managed, serviced, etc. by a service provider who offers to implement, deploy, and/or perform the functions of the present invention for others.

Computers 100/110/120 are only illustrative of various types of computer infrastructures for implementing the invention. For example, in one embodiment any of the computers 100/110/120 may comprise two or more computing devices (e.g., a server cluster) that communicate over a network to perform the various process steps of the invention. Moreover, computers 100/110/120 are only representative of various possible computer systems that can include numerous combinations of hardware. To this extent, in other embodiments, the computers 100/110/120 can comprise any specific purpose computing article of manufacture comprising hardware and/or computer program code for performing specific functions, any computing article of manufacture that comprises a combination of specific purpose and general purpose hardware/software, or can comprise any system for exchanging information with one or more external devices 144, or the like. In each case, the program code and hardware can be created using standard programming and engineering techniques, respectively.

Still further, it is understood that one or more additional components (e.g., system software, math co-processing unit, etc.) not shown in FIG. 1 can be included in computers 100/110/120. Although not shown, additional components, such as cache memory, communication systems, system software, etc., may be incorporated into the computers 100/110/120. In one embodiment the memory device 102 (and optionally the secure data 104) includes data distributed across, for example, a local area network (LAN), wide area network (WAN) or a storage area network (SAN) (not shown).

In another embodiment, the invention provides a method that performs the process steps of the invention on a subscription, advertising, and/or fee basis. That is, a service provider, such as a Solution Integrator, could offer to design and/or manufacture the memory devices described above. In this case, the service provider can create, maintain, support, etc., a computer infrastructure, such as a computer infrastructure 100/110 that performs process steps of the invention for one or more customers. In return, the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A removable digital data storage device, comprising:
a programmable memory controller coupled to a data storage medium and in communication with a motion detector auxiliary system and a data destruction means coupled to the medium;
the programmable memory controller to function as a device driver interface to a first computer;
the programmable memory controller to choose only one of a high security level and at least one lower security level to a data operation request by the first computer on the data storage medium in response to a security parameter input associated with the data operation request;
the programmable memory controller to determine access by the first computer to the data storage medium for the data operation by applying an access rule set of the correlated security level to a response to a query for a hardware access code, wherein an access rule set of the high security level is different from an access rule set of the at least one lower security level; and
the programmable memory controller to instruct the data destruction means to render data residing on the data storage medium unreadable by applying a security path of the correlated security level to the response to the query for the hardware access code, wherein a security path of the high security level is different from a security path of the at least one lower security level, and wherein each of the high security level path and the at least one lower security level security path are different from each of the high security level rule set and the at least one lower security level access rule set;
wherein the security parameter input associated with the data operation request comprises an elapsed time from a motion detected by the motion detector auxiliary system to a removal of the removable digital data storage device from the first computer, the programmable memory controller correlates the at least one lower security level with the data operation request in response to the elapsed time being within a specified threshold time period and correlates the high security level with the data operation request in response to the elapsed time exceeding the specified threshold time period.

2. The removable digital data storage device of claim 1, wherein the security parameter input associated with the data operation request comprises a physical location of the first computer;
the programmable memory controller to correlate the at least one lower security level to the data operation request in response to the security parameter input indicating that the first computer is within a designated physical location area; and
the programmable memory controller to correlate the high security level to the data operation request in response to the security parameter input indicating that the first computer is not within the designated physical location area.

3. The removable digital data storage device of claim 1, wherein the security parameter input associated with the data operation request comprises an authentication credential;
the programmable memory controller further to search the first computer for the authentication credential and to correlate the at least one lower security level with the data operation request in response to finding the authentication credential on the first computer and correlates the high security level with the data operation request in response to failing to find the authentication credential on the first computer.

4. The removable digital data storage device of claim 1, wherein the security parameter input associated with the data operation request comprises a user recognition;
the programmable memory controller further to correlate the at least one lower security level with the data operation request in response to receiving a user recognition input and to correlate the high security level with the data operation request in response to failing to receive the user recognition input.

5. The removable digital data storage device of claim 1, wherein the programmable memory controller is encoded with a firmware program, and wherein the firmware program wherein executed on the programmable memory controller causes the programmable memory controller to function as the device driver interface, correlate the security level, query for the hardware access code appropriate to the correlated security level, determine the access by the first computer to the data storage medium for the data operation pursuant to applying the access rule set of the correlated security level to the response to the query for the hardware access code, and instruct the data destruction means to render data residing on the data storage medium unreadable.

6. The removable digital data storage device of claim 1, wherein the programmable memory controller directly instructs the data destruction means to render data residing on the data storage medium unreadable independent of an operational status of the first computer.

7. The removable digital data storage device of claim 1, the programmable memory controller further to determine access by the first computer to the data storage medium for the data operation by applying an access rule set of a correlated at least one lower security level by repetitively querying for the hardware access code in response to a failure to provide the hardware access code in response to the query for the hardware access code; and
the programmable memory controller further to determine access by the first computer to the data storage medium for the data operation by applying an access rule set of a correlated high security level by instructing the data destruction means to immediately render data residing on the data storage medium unreadable in response to the failure to provide the hardware access code in response to the query for the hardware access code.

8. The removable digital data storage device of claim 7, wherein the at least one lower security level comprises a medium security level and a low security level;
the programmable memory controller further to apply a security path of a correlated low security level by repetitively querying for the hardware access code in response to the failure to provide the hardware access code in response to the query for the hardware access code until either the hardware access code is input or a threshold number of hardware access code input attempts is reached, prompting for input of an abort code if the threshold number is reached, powering down the first computer if the abort code is input, and instructing the data destruction means to render data residing on the data storage medium unreadable in response to a failure to receive a prompted input of the abort code;
the programmable memory controller further to apply a security path of a correlated medium security level by prompting for input of the abort code in response to the failure to provide the hardware access code in response to the query for the hardware access code, powering down the first computer if the abort code is input, and instructing the data destruction means to render data residing on the data storage medium unreadable in response to the failure to receive a prompted input of the abort code; and the programmable memory controller further to apply a security path of a correlated high security level path by immediately instructing the data destruction means to render data residing on the data storage medium unreadable in response to the failure to provide the hardware access code in response to the query for the hardware access code.

9. A method for protecting computer readable memory, comprising:

providing a removable digital data storage device comprising a programmable memory controller coupled to a data storage medium and in communication with a data destruction means coupled to the medium, the programmable memory controller to function as a device driver interface to a first computer by:

choosing only one of a high security level and at least one lower security level to a data operation request by the first computer on the data storage medium in response to a security parameter input associated with the data operation request;

determining access by the first computer to the data storage medium for the data operation by applying an access rule set of the correlated security level to a response to a query for a hardware access code, wherein an access rule set of the high security level is different from an access rule set of the at least one lower security level; and instructing the data destruction means to render data residing on the data storage medium unreadable by applying a security path of the correlated security level to the response to the query for the hardware access code, wherein a security path of the high security level is different from a security path of the at least one lower security level, and wherein each of the high security level path and the at least one lower security level security path are different from each of the high security level rule set and the at least one lower security level access rule set;

wherein the security parameter input associated with the data operation request comprises an elapsed time from a detected motion of the removable digital data storage device to a removal of the removable digital data storage device from the first computer, and the programmable memory controller correlates the at least one lower security level with the data operation request in response to the elapsed time being within a specified threshold time period and correlates the high security level with the data operation request in response to the elapsed time exceeding the specified threshold time period.

10. The method of claim 9, the programmable memory controller to function as the device driver by directly instructing the data destruction means to render data residing on the data storage medium unreadable independent of an operational status of the first computer.

11. The method of claim 9, the programmable memory controller to function as the device driver by:

determining access by the first computer to the data storage medium for the data operation by applying an access rule set of a correlated at least one lower security level by repetitively querying for the hardware access code in response to a failure to provide the hardware access code in response to the query for the hardware access code; and determining access by the first computer to the data storage medium for the data operation by applying an access rule set of a correlated high security level by instructing the data destruction means to immediately render data residing on the data storage medium unreadable in response to the failure to provide the hardware access code in response to the query for the hardware access code.

12. The method of claim 11, wherein the at least one lower security level comprises a medium security level and a low security level;

the programmable memory controller to function as the device driver by:

applying a security path of a correlated low security level by repetitively querying for the hardware access code in response to the failure to provide the hardware access code in response to the query for the hardware access code until either the hardware access code is input or a threshold number of hardware access code input attempts is reached, prompting for input of an abort code if the threshold number is reached, powering down the first computer if the abort code is input, and instructing the data destruction means to render data residing on the data storage medium unreadable in response to a failure to receive a prompted input of the abort code;

applying a security path of a correlated medium security level by prompting for input of the abort code in response to the failure to provide the hardware access code in response to the query for the hardware access code, powering down the first computer if the abort code is input, and instructing the data destruction means to render data residing on the data storage medium unreadable in response to the failure to receive a prompted input of the abort code; and applying a security path of a correlated high security level path by immediately instructing the data destruction means to render data residing on the data storage medium unreadable in response to the failure to provide the hardware access code in response to the query for the hardware access code.

13. A computer program product for protecting computer readable memory, said computer program product comprising:

a non-transitory computer readable storage medium;

first program instructions to choose only one of a high security level and at least one lower security level to a data operation request by a first computer on a non-transitory data storage medium in response to a security parameter input associated with the data operation request, the security parameter input comprising an elapsed time from a detected motion of the removable digital data storage device to a removal of the removable digital data storage device from the first computer;

second program instructions to determine access by the first computer to the data storage medium for the data operation by applying an access rule set of the correlated security level to a response to a query for a hardware access code, wherein an access rule set of the high security level is different from an access rule set of the at least one lower security level;

third program instructions to instruct a data destruction means to render data residing on the data storage medium unreadable by applying a security path of the correlated security level to the response to the query for the hardware access code, wherein a security path of the high security level is different from a security path of the at least one lower security level, and wherein each of the high security level and at least one lower security level security paths are different from each of the high security level and at least one lower security level access rule sets;

fourth program instructions to correlate the at least one lower security level with the data operation request in response to the elapsed time being within a specified threshold time period; and fifth program instructions to correlate the high security level with the data operation request in response to the elapsed time exceeding the specified threshold time period; and wherein said first, second, third, fourth and fifth program instructions are stored on said computer readable storage medium.

14. The computer program product of claim 13, further comprising:

sixth program instructions to directly instruct the data destruction means to render data residing on the data storage medium unreadable independent of an operational status of the first computer.

15. The computer program product of claim 13, wherein the security parameter input associated with the data operation request comprises a physical location of the first computer further comprising:

seventh program instructions to correlate the at least one lower security level to the data operation request in response to the security parameter input indicating that the first computer is within a designated physical location area; and eighth program instructions to correlate the high security level to the data operation request in response to the security parameter input indicating that the first computer is not within the designated physical location area; and wherein said seventh and eighth program instructions are stored on said computer readable storage medium.

16. The computer program product of claim 13, further comprising:

ninth program instructions to determine access by the first computer to the data storage medium for the data operation by applying the access rule set of the correlated at least one lower security level by repetitively querying for the hardware access code in response to a failure to provide the hardware access code in response to the query for the hardware access code; and tenth program instructions to determine access by the first computer to the data storage medium for the data operation by applying the access rule set of the correlated high security level by instructing the data destruction means to immediately render data residing on the data storage medium unreadable in response to the failure to provide the hardware access code in response to the query for the hardware access code; and wherein said ninth and tenth program instructions are stored on said computer readable storage medium.

17. The computer program product of claim 16, wherein the at least one lower security level comprises a medium security level and a low security level, further comprising:

eleventh program instructions to apply a security path of a correlated low security level by repetitively querying for the hardware access code in response to the failure to provide the hardware access code in response to the query for the hardware access code until either the hardware access code is input or a threshold number of hardware access code input attempts is reached, prompting for input of an abort code if the threshold number is reached, powering dawn the first computer if the abort code is input, and instructing the data destruction means to render data residing on the data storage medium unreadable in response to a failure to receive a prompted input of the abort code;

twelfth program instructions to apply a security path of a correlated medium security level by prompting for input of the abort code in response to the failure to provide the hardware access code in response to the query for the hardware access code, powering down the first computer if the abort code is input, and instructing the data destruction means to render data residing on the data storage medium unreadable in response to the failure to receive a prompted input of the abort code; and thirteenth program instructions to apply a security path of a correlated high security level path by immediately instructing the data destruction means to render data residing on the data storage medium unreadable in response to the failure to provide the hardware access code in response to the query for the hardware access code;

wherein said eleventh, twelfth and thirteenth program instructions are stored on said computer readable storage medium.

* * * * *